(12) United States Patent
Yadlapalli et al.

(10) Patent No.: US 11,290,546 B1
(45) Date of Patent: Mar. 29, 2022

(54) COMMON MODEL FOR PAIRING PHYSICAL AND/OR CLOUD-BASED STORAGE SYSTEMS FOR DATA MOBILITY

(71) Applicant: EMC IP Holding Company LLC, Hopkinton, MA (US)

(72) Inventors: Vasu Yadlapalli, Karnataka (IN); Girish Sheelvant, Hopkinton, MA (US); Matthew P. Jean, Shirley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/221,327

(22) Filed: Apr. 2, 2021

(51) Int. Cl.
| | | |
|---|---|---|
| *H04L 29/08* | (2006.01) | |
| *H04L 67/148* | (2022.01) | |
| *H04L 67/00* | (2022.01) | |
| *H04L 67/146* | (2022.01) | |
| *H04L 67/1097* | (2022.01) | |

(52) U.S. Cl.
CPC ........ *H04L 67/148* (2013.01); *H04L 67/1097* (2013.01); *H04L 67/146* (2013.01); *H04L 67/34* (2013.01)

(58) Field of Classification Search
CPC . H04L 67/148; H04L 67/1097; H04L 67/146; H04L 67/34
See application file for complete search history.

(56) References Cited

U.S. PATENT DOCUMENTS

| | | |
|---|---|---|
| 7,254,575 B1 | 8/2007 | Li et al. |
| 7,904,909 B1 | 3/2011 | Reiner et al. |
| 8,285,827 B1 | 10/2012 | Reiner et al. |
| 8,447,782 B1 | 5/2013 | Vipul et al. |
| 10,291,488 B1 | 5/2019 | Srinivasan et al. |
| 2015/0178050 A1* | 6/2015 | Said ............ G06Q 10/06 717/106 |
| 2018/0367412 A1* | 12/2018 | Sethi ............ H04L 41/0853 |
| 2019/0317670 A1* | 10/2019 | Weiss ............ G06F 3/0649 |
| 2020/0151144 A1* | 5/2020 | Kaushik ............ G06F 9/54 |

* cited by examiner

*Primary Examiner* — Sm A Rahman
(74) *Attorney, Agent, or Firm* — BainwoodHuang

(57) ABSTRACT

Techniques for providing a common object model for storage systems that facilitates the performance of data mobility use cases. In the techniques, a plurality of storage system objects for a plurality of storage systems, respectively, are instantiated from a common object model, in which the respective storage system objects have unique identifiers. Further, one or more storage system objects involved in one or more data mobility use cases are determined from among the plurality of storage system objects using the unique identifiers. The determined storage system objects include capabilities of at least some of the plurality of storage systems. Based on the capabilities included in the determined storage system objects, operations of the data mobility use cases are initiated at a system level via a single user interface, thereby providing uniform management of data mobility sessions that increases the efficiency of storage administrators.

20 Claims, 6 Drawing Sheets

COMMON MODEL FOR PAIRING PHYSICAL AND/OR CLOUD-BASED STORAGE SYSTEMS FOR DATA MOBILITY

BACKGROUND

Storage systems include one, two, or more storage controllers (also referred to herein as "storage nodes") communicably coupled to an array of storage devices (also referred to herein as a "storage array") such as magnetic disk drives, electronic flash drives, or optical drives. The storage systems are configured to service storage input/output (IO) requests issued by storage client computers (also referred to herein as "storage clients") that specify data elements such as data files, data blocks, or data pages to be created on, read from, written to, or deleted from storage objects such as file systems, volumes (VOLs), or logical units (LUs) stored on the storage array. For data mobility or protection purposes, storage administrators initiate data replication, import, migration, or backup operations on the storage systems that may involve one, two, or more of the storage objects stored on the storage array.

SUMMARY

The initiation of data replication, import, migration, or backup operations by a storage administrator can include pairing a storage system from one data center or cloud location with one or more other storage systems from different data centers or cloud locations. Such pairing of storage systems can include providing or exchanging information such as certificates, usernames, and/or passwords between the storage systems to allow them to authenticate and communicate with one another. Once paired, the storage systems can be directed by the storage administrator to perform data ingress and/or egress tasks involving the data replication, import, migration, or backup operations for various data mobility use cases.

However, such pairing of storage systems from different data center or cloud locations for the purpose of performing data mobility use cases can be complex and error prone for a storage administrator. For example, paired storage systems from disparate data center or cloud locations can have different object interfaces and require the storage administrator to access different computer interfaces (e.g., graphical user interfaces (GUIs), application programming interfaces (APIs), command line interfaces (CLIs)) to perform the data mobility use cases. Further, certain actions such as pausing or resuming data replication, import, migration, or backup operations, among others, can require the storage administrator to access multiple computer interfaces for multiple data mobility sessions, which can be time-consuming and inefficient for the storage administrator.

Techniques are disclosed herein for providing a common object model for physical and/or cloud-based storage systems to facilitate the performance of data mobility use cases. The disclosed techniques can allow a storage administrator to initiate and perform such data mobility use cases by accessing a single computer interface such as a GUI, API, or CLI, thereby providing uniform management of multiple data mobility sessions. The disclosed techniques can employ a storage system object based on a common object model for each of a plurality of storage systems. The common object model can include properties common to each storage system object, such as its type, capabilities, and state. The disclosed techniques can also persist type-specific attributes for each storage system object. In the disclosed techniques, one or more data mobility use cases can be associated with a respective storage system object, which can be referenced by a unique identifier. Based on the capabilities included in the storage system object, a storage administrator can, by accessing the single GUI, API, or CLI, initiate and perform operations of the data mobility use cases at the system level and in a transactional manner.

By instantiating, from a common object model, a plurality of storage system objects for a plurality of storage systems, respectively, in which the respective storage system objects have unique identifiers, determining, using the unique identifiers, one or more storage system objects involved in one or more data mobility use cases from among the plurality of storage system objects, in which the determined storage system objects include capabilities of at least some of the plurality of storage systems, and, based at least on the capabilities included in the determined storage system objects, initiating, via a single computer interface, operations of the data mobility use cases at the system level, uniform management of multiple data mobility sessions can be provided that increases the efficiency of storage administrators.

In certain embodiments, a method of performing data mobility use cases includes instantiating, from a common object model, a plurality of storage system objects for a plurality of storage systems, respectively. The plurality of storage system objects have a plurality of unique identifiers, respectively. The method further includes determining, using the plurality of unique identifiers, two or more storage system objects involved in at least one data mobility use case from among the plurality of storage system objects. The determined storage system objects include capabilities of at least some of the plurality of storage systems. The method further includes, based on the capabilities included in the determined storage system objects, initiating, via a single computer interface, operations of the at least one data mobility use case at a system level.

In certain arrangements, the method further includes selecting, via the single computer interface, two or more storage systems from among the plurality of storage systems, and selecting, via the single computer interface, a plurality of data mobility sessions to be established between the selected storage systems to accomplish the at least one data mobility use case.

In certain arrangements, each of the plurality of data mobility sessions has one of the instantiated storage system objects as a parent object. The parent object of each of the plurality of data mobility sessions includes a unique identifier from among the plurality of unique identifiers. The method further includes identifying, using the unique identifier included in the parent object of each of the plurality of data mobility sessions, the plurality of data mobility sessions selected to accomplish the at least one data mobility use case.

In certain arrangements, the method further includes selecting, via the single computer interface, at least one action to be performed across the identified data mobility sessions, and, in response to selecting the at least one action via the single computer interface, performing the at least one action across the identified data mobility sessions.

In certain arrangements, the method further includes selecting a pause action, and, in response to selecting the pause action, pausing the operations of the at least one data mobility use case across the identified data mobility sessions.

In certain arrangements, the method further includes selecting a resume action, and, in response to selecting the resume action, resuming the operations of the at least one data mobility use case across the identified data mobility sessions from where they were previously paused.

In certain arrangements, the method further includes, having selected the storage systems from among the plurality of storage systems, performing a pairing operation between a first storage system and a second storage system from among the selected storage systems.

In certain arrangements, the method further includes, having performed the pairing operation between the first storage system and the second storage system, performing, by the first storage system, a discovery operation to obtain configuration information from the second storage system.

In certain arrangements, the method further includes, based on the configuration information obtained from the second storage system, establishing a data mobility session between the first storage system and the second storage system to accomplish the at least one data mobility use case.

In certain embodiments, a system for performing data mobility use cases includes a single computer interface, a memory, and processing circuitry configured to execute program instructions out of the memory to instantiate, from a common object model, a plurality of storage system objects for a plurality of storage systems, respectively. The plurality of storage system objects have a plurality of unique identifiers, respectively. The processing circuitry is further configured to execute the program instructions out of the memory to determine, using the plurality of unique identifiers, two or more storage system objects involved in at least one data mobility use case from among the plurality of storage system objects. The determined storage system objects include capabilities of at least some of the plurality of storage systems. The processing circuitry is further configured to execute the program instructions out of the memory, based on the capabilities included in the determined storage system objects, to initiate, via the single computer interface, operations of the at least one data mobility use case at a system level.

In certain arrangements, the processing circuitry is further configured to execute the program instructions out of the memory to select, via the single computer interface, two or more storage systems from among the plurality of storage systems, and to select, via the single computer interface, a plurality of data mobility sessions to be established between the selected storage systems to accomplish the at least one data mobility use case.

In certain arrangements, each of the plurality of data mobility sessions has one of the instantiated storage system objects as a parent object. The parent object of each of the plurality of data mobility sessions includes a unique identifier from among the plurality of unique identifiers. The processing circuitry is further configured to execute the program instructions out of the memory to identify, using the unique identifier included in the parent object of each of the plurality of data mobility sessions, the plurality of data mobility sessions selected to accomplish the at least one data mobility use case.

In certain arrangements, the processing circuitry is further configured to execute the program instructions out of the memory to select, via the single computer interface, at least one action to be performed across the identified data mobility sessions, and, in response to selecting the at least one action via the single computer interface, to perform the at least one action across the identified data mobility sessions.

In certain arrangements, the processing circuitry is further configured to execute the program instructions out of the memory to select a pause action, and, in response to selecting the pause action, pause the operations of the at least one data mobility use case across the identified data mobility sessions.

In certain arrangements, the processing circuitry is further configured to execute the program instructions out of the memory to select a resume action, and, in response to selecting the resume action, resume the operations of the at least one data mobility use case across the identified data mobility sessions from where they were previously paused.

In certain embodiments, a computer program product includes a set of non-transitory, computer-readable media having instructions that, when executed by processing circuitry, cause the processing circuitry to perform a method including instantiating, from a common object model, a plurality of storage system objects for a plurality of storage systems, respectively. The plurality of storage system objects have a plurality of unique identifiers, respectively. The method further includes determining, using the plurality of unique identifiers, two or more storage system objects involved in at least one data mobility use case from among the plurality of storage system objects. The determined storage system objects include capabilities of at least some of the plurality of storage systems. The method further includes, based on the capabilities included in the determined storage system objects, initiating, via a single computer interface, operations of the at least one data mobility use case at a system level.

In certain arrangements, the computer program product includes the set of non-transitory, computer-readable media having the instructions that, when executed by the processing circuitry, cause the processing circuitry to perform the method further including selecting one of a pause action and a resume action, and, in response to selecting one of the pause action and the resume action, performing the selected one of the pause action and the resume action to pause or resume the operations of the at least one data mobility use case across the identified data mobility sessions.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary storage administrator computer that can be employed within the storage environment of FIG. 1a;

FIG. 1c is a block diagram of an exemplary storage system that can be included in a data center within the storage environment of FIG. 1a;

FIG. 2 is a block diagram of an exemplary storage system object based on a common object model for a storage system within the storage environment of FIG. 1a;

DETAILED DESCRIPTION

Figure 1A:
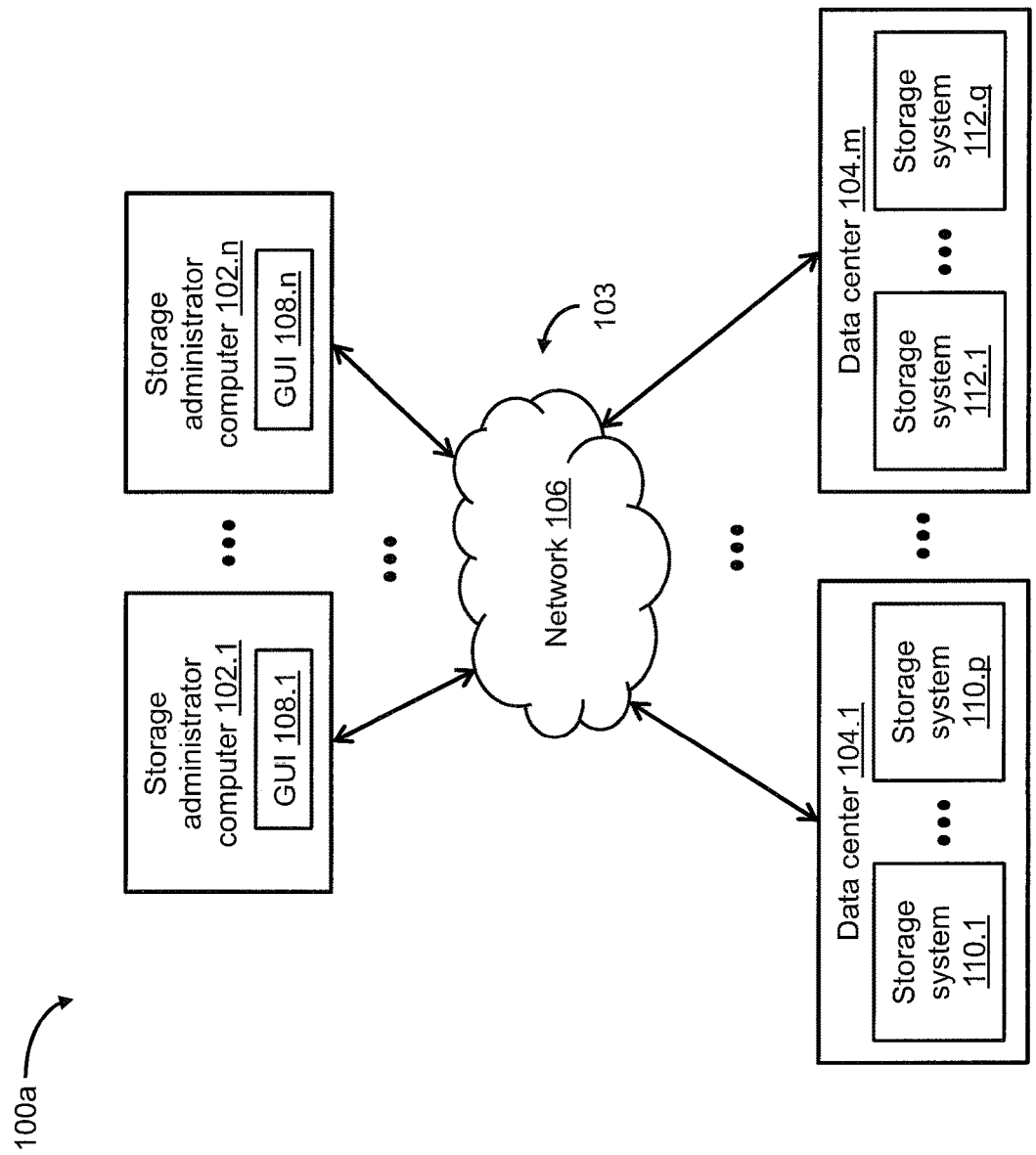
FIG. 1a is a block diagram of an exemplary storage environment, in which techniques can be practiced for providing a common object model for storage systems that facilitates the performance of data mobility use cases.

Techniques are disclosed herein for providing a common object model for physical and/or cloud-based storage systems to facilitate the performance of data mobility use cases. In the disclosed techniques, a plurality of storage system objects for a plurality of storage systems, respectively, can be instantiated from a common object model, in which the respective storage system objects can have unique identifiers. Further, one or more storage system objects involved in one or more data mobility use cases can be determined from among the plurality of storage system objects, using the unique identifiers. The determined storage system objects can include capabilities of at least some of the plurality of storage systems. Based at least on the capabilities included in the determined storage system objects, operations of the data mobility use cases can be initiated at the system level via a single computer interface. In this way, uniform management of multiple data mobility sessions can be provided that increases the efficiency of storage administrators.

FIG. 1 depicts an illustrative embodiment of an exemplary storage environment 100a, in which techniques can be practiced for providing a common object model for storage systems to facilitate the performance of data mobility use cases. As shown in FIG. 1a, the storage environment 100a can include a plurality of storage administrator computers 102.1, . . . , 102.n, a plurality of data centers 104.1, . . . , 104.m, and a communications medium 103 that includes at least one network 106. The plurality of storage administrator computers 102.1, . . . , 102.n can include a plurality of graphical user interfaces (GUIs) 108.1, . . . 108.n, respectively, or any other suitable visualization tools or systems. Further, each of the plurality of data centers 104.1, . . . , 104.m can include a plurality of storage system resources. For example, the data center 104.1 can include a plurality of storage systems 110.1, . . . , 110.p. Similarly, the data center 104.m can include a plurality of storage systems 112.1, . . . , 112.q. As employed herein, the term "data center" is intended to be broadly construed to encompass private, public, hybrid (i.e., part private and part public), or any other suitable arrangement of physical and/or cloud-based storage systems.

The communications medium 103 can be configured to interconnect the plurality of storage administrator computers 102.1, . . . , 102.n and the plurality of data centers 104.1, . . . , 104.m to enable them to communicate and exchange data and/or control signaling. As shown in FIG. 1a, the communications medium 103 can be illustrated as a "cloud" to represent different network topologies, such as a storage area network (SAN) topology, network attached storage (NAS) topology, local area network (LAN) topology, metropolitan area network (MAN) topology, wide area network (WAN) topology, wireless network topology, wired network topology, hybrid network topology, and so on, or any suitable combination thereof. As such, the communications medium 103 can include copper-based data communications devices and cabling, fiber optic-based communications devices and cabling, wireless communications devices, and so on, or any suitable combination thereof.

Figure 1C:
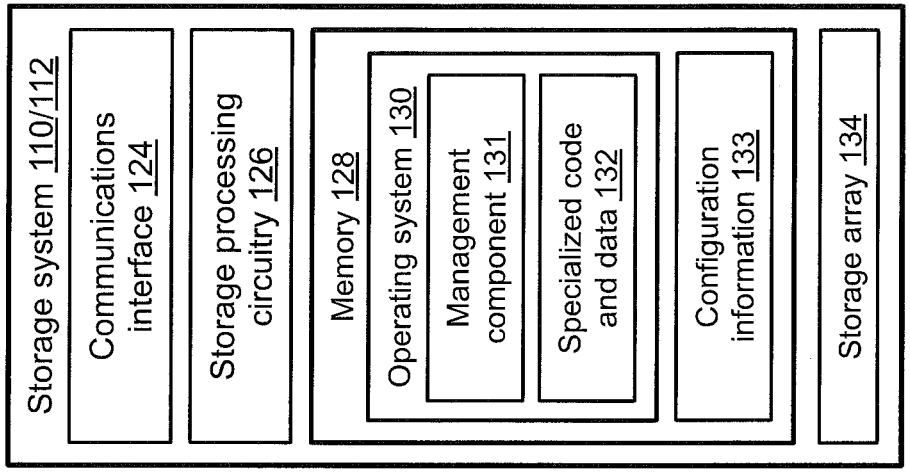
Figure 1B:
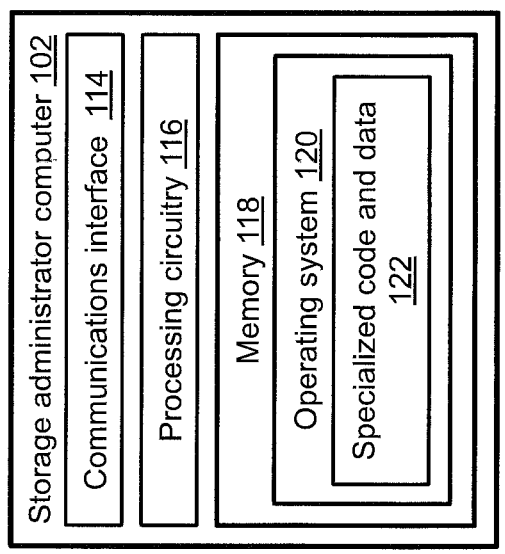

FIG. 1b depicts an exemplary storage administrator computer 102 that can be employed within the storage environment 100a of FIG. 1a. It is noted that each of the plurality of storage administrator computers 102.1, . . . , 102.n can be configured and arranged like the storage administrator computer 102. As shown in FIG. 1b, the storage administrator computer 102 can include a communications interface 114, processing circuitry 116, and a memory 118. The communications interface 114 can include any suitable network interface and/or adapter. The memory 118 can include volatile memory such as random-access memory (RAM), dynamic RAM (DRAM), or any other suitable volatile memory, as well as persistent memory such as read-only memory (ROM), flash memory, or any other suitable persistent memory. The memory 118 can be configured to store a variety of software constructs realized in the form of specialized code and data 122 (e.g., program instructions) that can be executed by the processing circuitry 116 to carry out techniques and/or methods disclosed herein. The memory 118 can further include an operating system (OS) 120 such as the Linux OS, Unix OS, Windows OS, or any other suitable operating system. The processing circuitry 116 can include processors, controllers, IO modules, and/or any other suitable physical or virtual computer components or combination thereof.

FIG. 1c depicts an exemplary storage system 110/112 that can be included in the data centers 104.1, . . . , 104.m within the storage environment 100a of FIG. 1a. It is noted that each of the plurality of storage systems 110.1, . . . , 110.p included in the data center 104.1, as well as each of the plurality of storage systems 112.1, . . . , 112.q included in the data center 104.m, can be configured and arranged like the storage system 110/112. As shown in FIG. 1c, the storage system 110/112 can include a communications interface 124, storage processing circuitry 126, a memory 128, and a storage array 134. The communications interface 124 can include an Ethernet interface/adapter, an InfiniBand interface/adapter, a fiber channel (FC) interface/adapter, a small computer system interface (iSCSI) interface/adapter, a transport control protocol (TCP) interface/adapter, or any other suitable communications interface/adapter. The storage processing circuitry 126 can include processors, controllers, IO modules, and/or any other suitable physical or virtual computer components or combination thereof. The memory 128 can include volatile memory such as RAM, DRAM, or any other suitable volatile memory, as well as persistent memory such as nonvolatile RAM (NVRAM), ROM, flash memory, or any other suitable persistent memory. The memory 128 can be configured to store a variety of software constructs such as a management component 131 and other specialized code and data 132 (e.g., program instructions), which can be executed by the storage processing circuitry 126 to carry out techniques and/or methods disclosed herein. The memory 128 can further include an OS 130 such as the Linux OS, Unix OS, Windows OS, or any other suitable operating system, as well as store configuration information 133 that includes the storage system's management software version, supported communication protocols (e.g., FC, iSCSI, TCP), supported data mobility capabilities, supported storage array capabilities, and/or any other suitable configuration information. The storage array 134 can include a plurality of storage devices, which can be embodied as hard disk drives (HDDs), solid-state drives (SSDs), flash drives, or any other suitable storage devices for storing storage object metadata and/or data.

In the context of the storage processing circuitry 126 of the storage system 110/112 being implemented with physical processors executing specialized code and data, a computer program product can be configured to deliver all or a portion of the specialized code and data to the respective processor(s). Such a computer program product can include non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

Figure 1D:
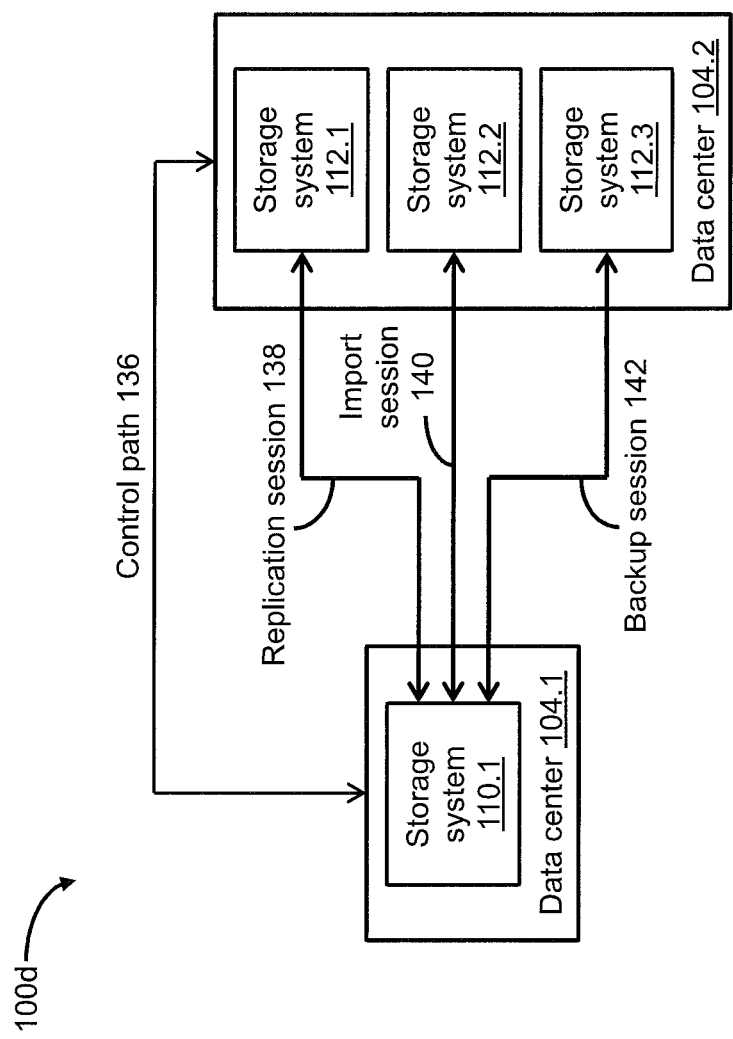
FIG. 1d is a block diagram of an exemplary scenario where a storage system from a first data center of the storage environment of FIG. 1a is paired with a plurality of other storage systems from a different second data center of the storage environment of FIG. 1a, in which the storage systems from the first and second data centers are paired for the purpose of establishing multiple data mobility sessions.

FIG. 1d depicts an exemplary scenario 100d where the local (or remote) storage system 110.1 from the data center 104.1 of the storage environment 100a is paired with each of the remote (or local) storage systems 112.1, 112.2, 112.3 from the data center 104.m of the storage environment 100a for the purpose of performing multiple data mobility use cases. As shown in FIG. 1d, the data mobility use cases can include a replication session 138 between the storage system 110.1 and the storage system 112.1, an import session 140 between the storage system 110.1 and the storage system 112.2, a backup session 142 between the storage system 110.1 and the storage system 112.3, and/or any other suitable data mobility session(s) between the storage system 110.1 and the respective storage systems 112.1, 112.2, 112.3. For example, the replication session 138 can include copying block or file system data from the local (or remote) storage system 110.1 to a replica block or file system on the remote (or local) storage system 112.1. Further, the import session 140 can include transferring block or file system data from the remote (or local) storage system 112.2 to block or file system storage on the local (or remote) storage system 110.1. Still further, the backup session 142 can include creating a snapshot (or "snap") copy on the remote (or local) storage system 112.3 of a volume (VOL) or logical unit (LU) on the local (or remote) storage system 110.1. As further shown in FIG. 1d, the scenario 100d can provide for a control path 136 between the data center 104.1 and the data center 104.m to initiate and accomplish the data replication, import, and backup sessions 138, 140, 142. For example, the control path 136 can be configured to support the representational state transfer (REST) standard, the secure socket shell (SSH) standard, or any other communications standard.

During operation, the disclosed techniques can allow a storage administrator operating a storage administrator computer (such as the storage administrator computer 102.1, . . . , or 102.n; see FIG. 1a) to initiate and perform data mobility use cases (such as those involving the replication session 138, the import session 140, and the backup session 142; see FIG. 1d) by accessing a single computer interface (such as the GUI 108.1, . . . , or 108.n; see FIG. 1a), thereby providing uniform management of multiple data mobility sessions. The disclosed techniques can employ a storage system object (also referred to herein as the "StorageSystem object") based on a common object model for each of a plurality of storage systems (such as the storage systems 110.1, 112.1, 112.2, 112.3; see FIG. 1d). The common object model can include properties common to each StorageSystem object, such as its type, capabilities, and state. The disclosed techniques can also persist type-specific attributes for each StorageSystem object. In the disclosed techniques, one or more data mobility use cases can be associated with a respective StorageSystem object, which can be referenced by a unique identifier (ID). Based on the capabilities included in the StorageSystem object, a storage administrator can, by accessing the single computer interface of the storage administrator computer, initiate and perform operations of the data mobility use cases at the system level. It is noted that such operations can be performed on a storage system in a transactional manner such that if an operation fails, then the storage system can be restored to its previous state, thereby avoiding leaving the storage system in an undesirable transient or unstable state.

Figure 2:
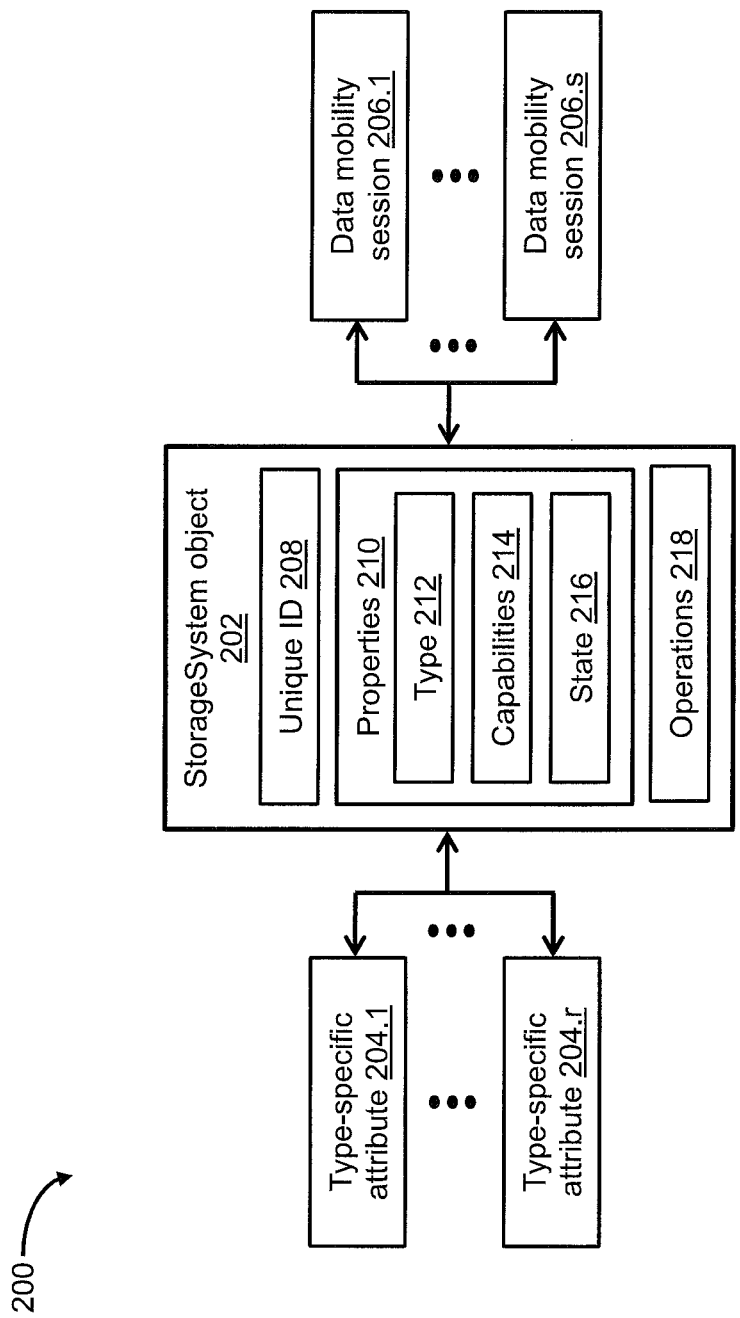

FIG. 2 depicts an exemplary StorageSystem object 202 configured to represent a storage system (such as the storage system 110.1, 112.1, 112.2, or 112.3; see FIG. 1d) within the storage environment 100a of FIG. 1a. As shown in FIG. 2, the StorageSystem object 202 is based on a common object model that can include a unique identifier (ID) 208, a plurality of properties 210, and one or more supported operations 218. The plurality of properties 210 can include a type 212, one or more capabilities 214, and a state 216. In some embodiments, the type 212 can be specified as "replication," "import," "backup," or any other suitable type. In some embodiments, the capabilities 214 can include performing block replication, file replication, block import, file import, backup (e.g., creating a remote snapshot copy), and/or any other suitable capability.

With the block replication capability, the storage system represented by the StorageSystem object 202 can support block replication with one or more other physical and/or cloud-based storage systems, allowing a storage administrator to perform disaster recovery (DR) operations at the system level. With the file replication capability, the storage system represented by the StorageSystem object 202 can support file replication with one or more other physical and/or cloud-based storage systems, again allowing the storage administrator to perform DR operations at the system level. With the block import capability, the storage system represented by the StorageSystem object 202 can support the import of block objects from one or more other physical and/or cloud-based storage systems, allowing the storage administrator to perform block import operations at the system level. With the file import capability, the storage system represented by the StorageSystem object 202 can support the import of file objects from one or more other physical and/or cloud-based storage systems, allowing the storage administrator to perform file import operations at the system level. With the backup capability, the storage system represented by the StorageSystem object 202 can support data backup and/or recovery operations with one or more other physical and/or cloud-based storage systems, allowing the storage administrator to perform backup/recovery operations at the system level.

In some embodiments, the supported operations 218 can include replication operations, pause or resume replication operations, suspend replication operations, disaster recovery (DR) failover operations, import operations, pause or resume import operations, cancel import operations, backup operations, pause or resume backup operations, pause or resume data ingress or egress operations, view metrics operations, view common metrics operations, among others. The replication operations can allow the storage administrator to select, via a single computer interface (e.g., a GUI, API, CLI), a remote storage system to which block or file system data from the storage system represented by the StorageSystem object 202 is to be copied to a replica block or file system. Further, the storage system represented by the StorageSystem object 202 can determine source and target storage objects for the replication operations, as well as perform storage array-specific orchestrations of the replication operations by creating block or file replication sessions, as appropriate. The pause or resume replication operations can allow the storage administrator to select, via the single computer interface, one or more remote storage systems involved in replication sessions with the storage system represented by the StorageSystem object 202 and select a "pause" or "resume" action for one, some, or all of the replication sessions. Further, the storage system represented by the StorageSystem object 202 can determine the replication sessions associated with the selected remote storage systems and perform storage array-specific orchestrations to pause or resume the respective block or file replication sessions, as appropriate.

The suspend replication operations can allow the storage administrator to select, via the single computer interface, a "suspend replication" action to suspend one, some, or all of the replication sessions involving the storage system represented by the StorageSystem object 202. Further, the storage system represented by the StorageSystem object 202 can determine one or more remote storage systems involved in the replication sessions and perform storage array-specific orchestrations to suspend the respective replication sessions. The DR failover operations can allow the storage administrator to select, via the single computer interface, one or more remote storage systems involved in replication sessions with the storage system represented by the StorageSystem object 202 and select a "DR failover" action. Further, the storage system represented by the StorageSystem object 202 can determine the remote storage systems involved in the replication sessions and perform storage array-specific orchestrations to failover to the appropriate remote storage system.

The import operations can allow the storage administrator to select, via a single computer interface, a remote storage system from which block or file system data is to be transferred to the storage system represented by the StorageSystem object 202. Further, the storage system represented by the StorageSystem object 202 can determine source and target objects for the import operations, as well as perform storage array-specific orchestrations of the import operations by creating block or file import sessions, as appropriate. The pause or resume import operations can allow the storage administrator to select, via the single computer interface, one or more remote storage systems involved in import sessions with the storage system represented by the StorageSystem object 202 and select a "pause" or "resume" action for one, some, or all of the import sessions. Further, the storage system represented by the StorageSystem object 202 can determine the import sessions associated with the selected remote storage systems and perform storage array-specific orchestrations to pause or resume the respective block or file import sessions, as appropriate.

The cancel import operations can allow the storage administrator to select, via the single computer interface, a "cancel import" action to cancel one or more import sessions involving the storage system represented by the StorageSystem object 202. Further, the storage system represented by the StorageSystem object 202 can determine one or more remote storage systems involved in the import sessions and perform storage array-specific orchestrations to cancel the respective import sessions. The backup operation can allow the storage administrator to select, via the single computer interface, storage array-specific data protection policies and/or schedules for the storage system represented by the StorageSystem object 202. Further, the storage system represented by the StorageSystem object 202 can perform storage array-specific orchestrations to perform the backup operations, including creating snapshot copies on selected remote storage systems and performing snapshot difference ("snap diff") operations.

The pause or resume backup operations can allow the storage administrator to select, via the single computer interface, one or more remote storage systems involved in backup sessions with the storage system represented by the StorageSystem object 202 and select a "pause" or "resume" action for one, some, or all of the backup sessions. Further, the storage system represented by the StorageSystem object 202 can determine the backup sessions associated with the selected remote storage systems and perform storage array-specific orchestrations to pause or resume the respective backup sessions.

The pause or resume data ingress or egress operations can allow the storage administrator to select, via the single computer interface, one or more remote storage systems involved in data ingress or egress sessions with the storage system represented by the StorageSystem object 202 and select a "pause" or "resume" action for one, some, or all of the data ingress or egress sessions. Further, the storage system represented by the StorageSystem object 202 can determine the data ingress or egress sessions associated with the selected remote storage systems and perform storage array-specific orchestrations to pause or resume the respective data ingress or egress sessions. The view metrics operations can allow the storage administrator to collect and view, via the single computer interface, metrics pertaining to data ingress/egress for some or all local and/or remote storage systems, as well as metrics pertaining to data ingress/egress for some or all data mobility use cases in-progress. The view common metrics operations can allow the storage administrator to collect and view, via the single computer interface, metrics common to all data ingress/egress sessions at the system level. It is noted that such metrics pertaining to data ingress/egress sessions and data mobility use cases can include IO bandwidth, data transfer rate, and so on.

As shown in FIG. 2, a plurality of type-specific attributes 204.1, . . . , 204.*r* can be associated and persisted with the StorageSystem object 202. For example, if the object type 212 is specified as "replication," "import," or "backup," then the type-specific attributes 204.1, . . . , 204.*r* can correspond to replication-specific attributes, import-specific attributes, or backup-specific attributes, respectively. Further, the type-specific attributes 204.1, . . . , 204.*r* can have values pertaining to how the storage system maintains and stores data, metadata, and/or other information for the specified type of storage system object. The state 216 can be defined by the values of the type-specific attributes 204.1, . . . , 204.*r*. As further shown in FIG. 2, each of a plurality of data mobility sessions 206.1, . . . , 206.*s* can have the StorageSystem object 202 as its parent object referenced by the unique ID 208. In some embodiments, the plurality of data mobility sessions 206.1, . . . , 206.*s* can include a block replication session, a file replication session, a block import session, a file import session, a backup session, and/or any other suitable data mobility session.

The disclosed techniques for providing a common object model for physical or cloud-based storage systems to facilitate the performance of data mobility use cases will be further understood with reference to the following illustrative example. In this example, a storage administrator operating a storage administrator computer (e.g., the storage administrator computer 102.1, . . . , or 102.n; see FIG. 1a) initiates and performs, by accessing a single computer interface (e.g., a graphical user interface (GUI) 300; see FIG. 3), several data mobility use cases involving multiple storage systems from different data centers and/or cloud locations, each of which can be represented by a storage system object like the StorageSystem object 200 (see FIG. 2) based on a common object model.

Figure 3:
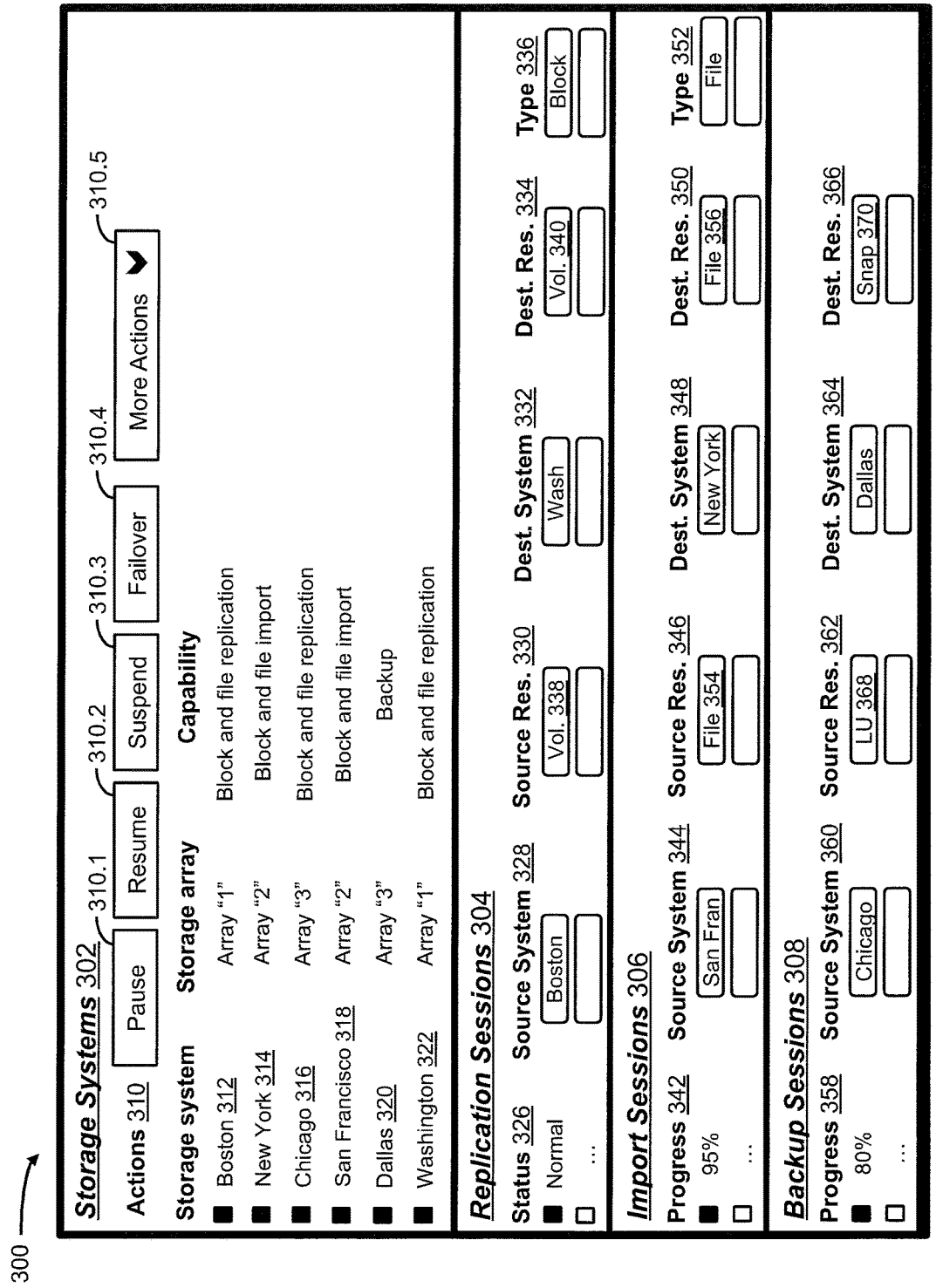
FIG. 3 is an illustration of an exemplary graphical user interface (GUI) that can be accessed by a storage administrator to establish the multiple data mobility sessions of FIG. 1d.

FIG. 3 depicts an illustration of the GUI 300 that can be accessed by the storage administrator to perform the several data mobility use cases of this example. As shown in FIG. 3, the GUI 300 can include at least four (4) main areas, which are designated as "Storage Systems" 302, "Replication Sessions" 304, "Import Sessions" 306, and "Backup Sessions" 308. The Storage Systems 302 area can allow the storage administrator to select multiple storage systems to participate in one or more replication, import, and/or backup sessions. In this example, the storage administrator can select from among multiple storage systems designated as "Boston" 312, "New York" 314, "Chicago" 316, "San Francisco" 318, "Dallas" 320, and "Washington" 322, which are associated with multiple storage arrays of types designated as Array "1," Array "2," Array "3," Array "2," Array "3," and Array "1," respectively. As further shown in FIG. 3, each of the storage systems designated as Boston 312, New York 314, Chicago 316, San Francisco 318, Dallas 320, and Washington 322 can have one or more capabilities. For example, each of the storage systems designated as Boston 312, Chicago 316, and Washington 322 can have block and file replication capabilities, each of the storage systems designated as New York 314 and San Francisco 318 can have block and file import capabilities, and the storage system designated as Dallas 320 can have a backup capability. The Storage Systems 302 area can allow the storage administrator to select one or more actions 310 to be performed for one, some, or all of the replication, import, and/or backup sessions. In this example, the storage administrator can select from among a plurality of action buttons including a "Pause" action button 310.1, a "Resume" action button 310.2, a "Suspend" action button 310.3, and a "Failover" action button 310.4. Further, the storage administrator can select a drop-down menu to display more actions 310.5 that can be performed for one or more of the replication, import, and/or backup sessions.

In this example, the storage administrator operating the storage administrator computer initiates and performs, by accessing the GUI 300, a replication use case involving the storage systems designated as Boston 312 (the "Boston" system) and Washington 322 (the "Washington" or "Wash" system). As noted herein, the Boston system and the Washington system can be from different data centers and/or cloud locations. Further, each of the Boston and Washington systems can have block and file replication capabilities. Accordingly, the replication use case of this example can include establishing a block replication session between the Boston system and the Washington system.

To that end, the storage administrator selects, via the GUI 300, the Boston system and the Washington system (as indicated by shaded blocks adjacent the Boston 312 and Washington 322 legends in the Storage Systems 302 area), as well as a replication session (as indicated by a shaded block below a status 326 legend in the Replication Sessions 304 area). In this example, the replication session includes copying block volume data from the Boston system to a replica block volume on the Washington system. As shown in FIG. 3, in the Replication Sessions 304 area of the GUI 300, the storage administrator has entered "Boston" as a source system 328, a block volume ("Vol.") 338 as a source resource 330, Washington ("Wash") as a destination system 332, a replica block volume ("Vol.") 340 as a destination resource 334, and "Block" as a type 336 of the replication session. Further, in the Replication Sessions 304 area of the GUI 300, the status 326 is indicated as "Normal."

Having selected the Boston and Washington systems for the replication session, a pairing operation is initiated in which authentication information (e.g., certificates, usernames, passwords) is entered and/or exchanged between management components (e.g., the management component 131; see FIG. 1c) of the respective storage systems. Once the Boston and Washington systems have been successfully paired and enabled to communicate with one another, the Boston system initiates and performs a discovery operation to gather or obtain configuration information (e.g., the configuration information 133; see FIG. 1c) from the Washington system. In response to the discovery operation initiated by the Boston system, the Washington system provides its configuration information to the Boston system, including the version of its management software, its supported protocols (e.g., FC, iSCSI, TCP) for data ingress and/or egress operations, its supported capabilities (e.g., block and file replication) for data mobility, the type of its storage array (e.g., Array "1"), and/or any other suitable configuration information. Based on the configuration information provided by the Washington system, the Boston system establishes the block replication session with the Washington system and performs orchestrations of operations specific to the Array "1" type to accomplish the replication use case.

Further in this example, the storage administrator operating the storage administrator computer initiates and performs, by accessing the GUI 300, an import use case involving the storage systems designated as New York 314 (the "New York" system) and San Francisco 318 (the "San Francisco" or "San Fran" system). As noted herein, the New York system and the San Francisco system can be from different data centers and/or cloud locations. Further, each of the New York and San Francisco systems can have block and file import capabilities. Accordingly, the import use case of this example can include establishing a file import session between the New York system and the San Francisco system.

To that end, the storage administrator selects, via the GUI 300, the New York system and the San Francisco system (as indicated by shaded blocks adjacent the New York 314 and San Francisco 318 legends in the Storage Systems 302 area), as well as an import session (as indicated by a shaded block below a progress 342 legend in the Import Sessions 306 area). In this example, the import session includes transferring file system data from the San Francisco system to file system storage on the New York system. As shown in FIG. 3, in the Import Sessions 306 area of the GUI 300, the storage administrator has entered San Francisco ("San Fran") as a source system 344, a file system 354 as a source resource 346, "New York" as a destination system 348, file system storage 356 as a destination resource 350, and "File" as a type 352 of the import session. Further, in the Import Sessions 306 area of the GUI 300, the progress 342 is indicated as "95%" completed.

Having selected the New York and San Francisco systems for the import session, a pairing operation is initiated in which authentication information (e.g., certificates, usernames, passwords) is entered and/or exchanged between management components (e.g., the management component 131; see FIG. 1c) of the respective storage systems. Once the New York system and the San Francisco system have been successfully paired and enabled to communicate with one another, the San Francisco system initiates and performs a discovery operation to gather or obtain configuration information (e.g., the configuration information 133; see FIG. 1c) from the New York system. In response to the discovery operation initiated by the San Francisco system, the New York system provides its configuration information to the San Francisco system, including the version of its management software, its supported protocols (e.g., FC, iSCSI, TCP) for data ingress and/or egress operations, its supported capabilities (e.g., block and file import) for data mobility, the type of its storage array (e.g., Array "2"), and/or any other suitable configuration information. Based on the configuration information provided by the New York system, the San Francisco system establishes the file import session with the New York system and performs orchestrations of operations specific to the Array "2" type to accomplish the import use case.

Still further in this example, the storage administrator operating the storage administrator computer initiates and performs, by accessing the GUI 300, a backup use case involving the storage systems designated as Chicago 316 (the "Chicago" system) and Dallas 320 (the "Dallas" system). As noted herein, the Chicago system and the Dallas system can be from different data centers and/or cloud locations. Further, the Chicago system can have block and file replication capabilities and the Dallas system can have a backup capability. Accordingly, the backup use case of this example can include establishing a backup session from the Chicago system to the Dallas system.

To that end, the storage administrator selects, via the GUI 300, the Chicago system and the Dallas system (as indicated by shaded blocks adjacent the Chicago 316 and Dallas 320 legends in the Storage Systems 302 area), as well as a backup session (as indicated by a shaded block below a progress 358 legend in the Backup Sessions 308 area). In this example, the backup session includes creating a snapshot ("snap") copy on the Dallas system of a logical unit (LU) on the Chicago system. As shown in FIG. 3, in the Backup Sessions 308 area of the GUI 300, the storage administrator has entered "Chicago" as a source system 360, LU 368 as a source resource 362, "Dallas" as a destination system 364, and snap copy 370 as a destination resource 366. Further, in the Backup Sessions 308 area of the GUI 300, the progress 358 is indicated as "80%" completed.

Having selected the Chicago and Dallas systems for the backup session, a pairing operation is initiated in which authentication information (e.g., certificates, usernames, passwords) is entered and/or exchanged between management components (e.g., the management component 131; see FIG. 1c) of the respective storage systems. Once the Chicago system and the Dallas system have been successfully paired and enabled to communicate with one another, the Chicago system initiates and performs a discovery operation to gather or obtain configuration information (e.g., the configuration information 133; see FIG. 1c) from the Dallas system. In response to the discovery operation initiated by the Chicago system, the Dallas system provides its configuration information to the Chicago system, including the version of its management software, its supported protocols (e.g., FC, iSCSI, TCP) for data ingress and/or egress operations, its supported capabilities (e.g., backup) for data mobility, the type of its storage array (e.g., Array "3"), and/or any other suitable information. Based on the configuration information provided by the Dallas system, the Chicago system establishes the backup session with the Dallas system and performs orchestrations of operations specific to the Array "3" type to accomplish the backup use case.

As noted herein, each of the storage systems designated as Boston, New York, Chicago, San Francisco, Dallas, and Washington can be represented by a storage system object like the StorageSystem object 200 (see FIG. 2), which is based on a common object model. As such, the various types (e.g., replication, import, backup) of data mobility sessions, capabilities (e.g., block and file replication, block and file import, backup) of the storage systems, and operations (e.g., discovery operations, data ingress/egress operations, storage array-specific operations) of the storage systems can be included or stored in the storage system objects that represent the respective storage systems. Further, each replication, import, and backup session established in this example can have its own parent storage system object (also referred to herein as the "parent object") referenced by a unique identifier (ID) like the unique ID 208 (see FIG. 2). In this example, the replication session established between the Boston and Washington systems can have the storage system object of the Boston system as its parent object. Further, the import session established between the San Francisco and New York systems can have the storage system object of the San Francisco system as its parent object. Still further in this example, the backup session established between the Chicago and Dallas systems can have the storage system object of the Chicago system as its parent object. Using the unique IDs of the respective parent objects, the disclosed techniques can identify, at the system level, the data mobility sessions, storage system objects, data ingress/egress operations, and/or storage array-specific operations associated with the replication, import, and backup use cases. Once the sessions, objects, and/or operations have been identified, the storage administrator can effectively aggregate the replication, import, and backup sessions to enforce and perform selected actions across the aggregated sessions, all via the same single GUI 300.

In this example, the storage administrator enforces pause and resume actions across the replication, import, and backup sessions that have the Boston system, the San Francisco system, and the Chicago system as their parent objects, respectively. For example, the storage administrator can decide to pause the replication, import, and/or backup sessions for maintenance and/or administrative purposes. To that end, the storage administrator selects, via the GUI 300, one, two, or all of the replication, import, and backup sessions (as indicated by the shaded blocks in the Replication, Import, and Backup Sessions 304, 306, 308 areas), and clicks or selects, via the GUI 300, the Pause action button 310.1 in the Storage Systems 302 area. In response to clicking or selecting the Pause action button 310.1, the replication, import, and/or backup sessions and their storage system objects/operations are identified by the unique IDs of the parent objects, and the operations of the replication, import, and/or backup sessions are paused. At a later time, the storage administrator clicks or selects the Resume action button 310.2 in the Storage Systems 302 area. In response to clicking or selecting the Resume action button 310.2, the replication, import, and/or backup sessions and their storage system objects/operations are again identified by the unique IDs of the parent objects, and the operations of the replication, import, and/or backup sessions are resumed from where they were previously paused. It is noted that the data mobility sessions and their storage system objects/operations can be identified by the unique IDs of the parent objects at the session level, the single system level, or the group of systems level, depending upon the specific action(s) to be enforced and performed across the various data mobility sessions.

Figure 4:
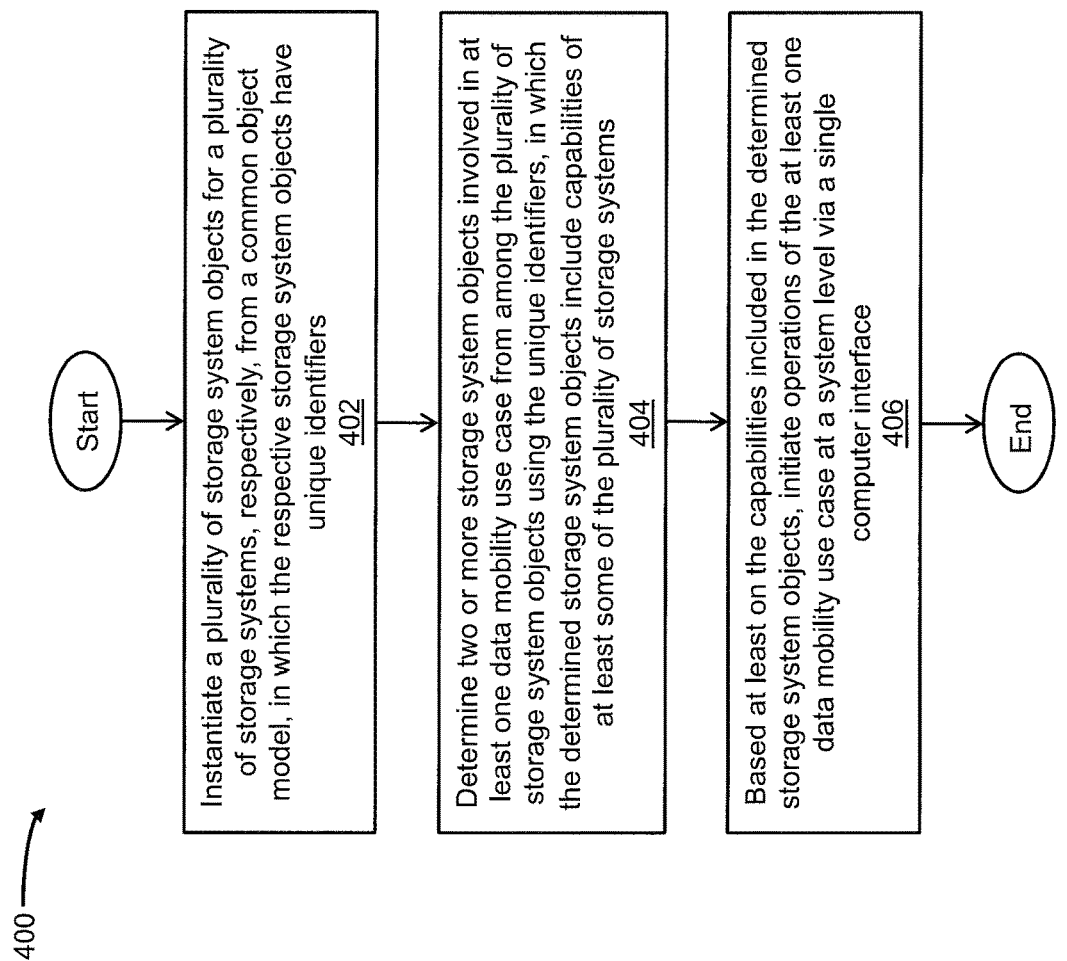
FIG. 4 is a flow diagram of an exemplary method of employing a common object model for storage systems to facilitate the performance of data mobility use cases.

An exemplary method of employing a common object model for a plurality of storage systems to facilitate the performance of data mobility use cases is described below with reference to FIG. 4. As depicted in block 402, a plurality of storage system objects for a plurality of storage systems, respectively, are instantiated from a common object model, in which the respective storage system objects have unique identifiers. As depicted in block 404, two or more storage system objects involved in at least one data mobility use case are determined from among the plurality of storage system objects using the unique identifiers, in which the determined storage system objects include capabilities of at least some of the plurality of storage systems. As depicted in block 406, based at least on the capabilities included in the determined storage system objects, operations of the at least one data mobility use case are initiated at a system level via a single computer interface. In this way, uniform management of multiple data mobility sessions can be provided that increases the efficiency of storage administrators.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of performing data mobility use cases, comprising:
    instantiating, from a common object model, a plurality of storage system objects for a plurality of storage systems, respectively, the plurality of storage system objects being referenced by a plurality of unique identifiers, respectively, each storage system object having a plurality of properties including one or more data mobility capabilities of a respective storage system from among the plurality of storage systems, the plurality of storage systems being from a plurality of different data centers or cloud locations, respectively;
    determining, using the plurality of unique identifiers, two or more storage system objects from among the plurality of storage system objects, the two or more storage system objects being associated with at least one data mobility use case, the two or more determined storage system objects having properties including data mobility capabilities of two or more storage systems, respectively, from among the plurality of storage systems; and
    based at least on the data mobility capabilities of the two or more storage systems included in the properties of the two or more determined storage system objects, respectively, initiating, via a single computer interface, operations to perform the at least one data mobility use case at a system level.

2. The method of claim 1 further comprising:
    selecting, via the single computer interface, the two or more storage systems from among the plurality of storage systems; and
    selecting, via the single computer interface, a plurality of data mobility sessions of the at least one data mobility use case to be established between the two or more selected storage systems.

3. The method of claim 2 wherein each of the plurality of data mobility sessions has one of the instantiated storage system objects as a parent object, wherein the parent object of each of the plurality of data mobility sessions includes a unique identifier from among the plurality of unique identifiers, and wherein the method further comprises:
   identifying, using the unique identifier included in the parent object of each of the plurality of data mobility sessions, the plurality of data mobility sessions of the at least one data mobility use case.

4. The method of claim 3 further comprising:
   selecting, via the single computer interface, at least one action to be performed across the identified data mobility sessions; and
   in response to selecting the at least one action via the single computer interface, performing the at least one action across the identified data mobility sessions.

5. The method of claim 4 wherein the selecting of the at least one action includes selecting a pause action, and wherein the performing of the at least one action includes, in response to selecting the pause action, pausing the operations of the at least one data mobility use case across the identified data mobility sessions.

6. The method of claim 5 wherein the selecting of the at least one action includes selecting a resume action, and wherein the performing of the at least one action includes, in response to selecting the resume action, resuming the operations of the at least one data mobility use case across the identified data mobility sessions from where they were previously paused.

7. The method of claim 2 further comprising:
   having selected the two or more storage systems from among the plurality of storage systems, performing a pairing operation between a first storage system and a second storage system from among the two or more selected storage systems.

8. The method of claim 7 further comprising:
   having performed the pairing operation between the first storage system and the second storage system, performing, by the first storage system, a discovery operation to obtain configuration information from the second storage system.

9. The method of claim 8 further comprising:
   based on the configuration information obtained from the second storage system, establishing a data mobility session of the at least one data mobility use case between the first storage system and the second storage system.

10. A system for performing data mobility use cases, comprising:
    a single computer interface;
    a memory; and
    processing circuitry configured to execute program instructions out of the memory to:
       instantiate, from a common object model, a plurality of storage system objects for a plurality of storage systems, respectively, the plurality of storage system objects being referenced by a plurality of unique identifiers, respectively, each storage system object having a plurality of properties including one or more data mobility capabilities of a respective storage system from among the plurality of storage systems, the plurality of storage systems being from a plurality of different data centers or cloud locations, respectively;
       determine, using the plurality of unique identifiers, two or more storage system objects from among the plurality of storage system objects, the two or more storage system objects being associated with at least one data mobility use case, the two or more determined storage system objects having properties including data mobility capabilities of two or more storage systems, respectively, from among the plurality of storage systems; and
       based at least on the data mobility capabilities of the two or more storage systems included in the properties of the two or more determined storage system objects, respectively, initiate, via the single computer interface, operations to perform the at least one data mobility use case at a system level.

11. The system of claim 10 wherein the processing circuitry is further configured to execute the program instructions out of the memory to:
    select, via the single computer interface, the two or more storage systems from among the plurality of storage systems; and
    select, via the single computer interface, a plurality of data mobility sessions of the at least one data mobility use case to be established between the two or more selected storage systems.

12. The system of claim 11 wherein each of the plurality of data mobility sessions has one of the instantiated storage system objects as a parent object, wherein the parent object of each of the plurality of data mobility sessions includes a unique identifier from among the plurality of unique identifiers, and wherein the processing circuitry is further configured to execute the program instructions out of the memory to identify, using the unique identifier included in the parent object of each of the plurality of data mobility sessions, the plurality of data mobility sessions of the at least one data mobility use case.

13. The system of claim 12 wherein the processing circuitry is further configured to execute the program instructions out of the memory to:
    select, via the single computer interface, at least one action to be performed across the identified data mobility sessions; and
    in response to selecting the at least one action via the single computer interface, perform the at least one action across the identified data mobility sessions.

14. The system of claim 13 wherein the processing circuitry is further configured to execute the program instructions out of the memory to:
    select a pause action; and
    in response to selecting the pause action, pause the operations of the at least one data mobility use case across the identified data mobility sessions.

15. The system of claim 14 wherein the processing circuitry is further configured to execute the program instructions out of the memory to:
    select a resume action; and
    in response to selecting the resume action, resume the operations of the at least one data mobility use case across the identified data mobility sessions from where they were previously paused.

16. A computer program product including a set of non-transitory, computer-readable media having instructions that, when executed by processing circuitry, cause the processing circuitry to perform a method comprising:
    instantiating, from a common object model, a plurality of storage system objects for a plurality of storage systems, respectively, the plurality of storage system objects being referenced by a plurality of unique identifiers, respectively, each storage system object having a plurality of properties including one or more data mobility capabilities of a respective storage system from among the plurality of storage systems, the plurality of storage systems being from a plurality of different data centers or cloud locations, respectively;

determining, using the plurality of unique identifiers, two or more storage system objects from among the plurality of storage system objects, the two or more storage system objects being associated with at least one data mobility use case, the two or more determined storage system objects having properties including data mobility capabilities of two or more storage systems, respectively, from among the plurality of storage systems; and based at least on the data mobility capabilities of the two or more storage systems included in the properties of the two or more determined storage system objects, respectively, initiating, via a single computer interface, operations to perform the at least one data mobility use case at a system level.

17. The computer program product of claim 16 wherein the method further comprises:

selecting, via the single computer interface, the two or more storage systems from among the plurality of storage systems; and selecting, via the single computer interface, a plurality of data mobility sessions of the at least one data mobility use case to be established between the two or more selected storage systems.

18. The computer program product of claim 17 wherein each of the plurality of data mobility sessions has one of the instantiated storage system objects as a parent object, wherein the parent object of each of the plurality of data mobility sessions includes a unique identifier from among the plurality of unique identifiers, and wherein the method further comprises:

identifying, using the unique identifier included in the parent object of each of the plurality of data mobility sessions, the plurality of data mobility sessions of the at least one data mobility use case.

19. The computer program product of claim 18 wherein the method further comprises:

selecting, via the single computer interface, at least one action to be performed across the identified data mobility sessions; and in response to selecting the at least one action via the single computer interface, performing the at least one action across the identified data mobility sessions.

20. The computer program product of claim 19 wherein the selecting of the at least one action includes selecting one of a pause action and a resume action, and wherein the performing of the at least one action includes, in response to selecting one of the pause action and the resume action, performing the selected one of the pause action and the resume action to pause or resume the operations of the at least one data mobility use case across the identified data mobility sessions.

* * * * *